(12) United States Patent
Fenstermaker et al.

(10) Patent No.: US 11,794,513 B2
(45) Date of Patent: Oct. 24, 2023

(54) WHEEL FOR A SUPPORT STRUCTURE

(71) Applicant: The Goodyear Tire & Rubber Company, Akron, OH (US)

(72) Inventors: Christopher Dean Fenstermaker, Canfield, OH (US); Arun Kumar Byatarayanapura Gopala, Copley, OH (US); Michael Joseph Durr, Stow, OH (US); Wesley Glenn Sigler, Barberton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 115 days.

(21) Appl. No.: 17/522,000

(22) Filed: Nov. 9, 2021

(65) Prior Publication Data

US 2023/0144443 A1 May 11, 2023

(51) Int. Cl.
*B60B 3/16* (2006.01)
*B60C 7/26* (2006.01)
*B60B 3/10* (2006.01)

(52) U.S. Cl.
CPC .............. *B60B 3/16* (2013.01); *B60B 3/10* (2013.01); *B60C 7/26* (2013.01); *B60B 2320/10* (2013.01)

(58) Field of Classification Search
CPC ............ B60C 7/26; B60B 3/10; B60B 3/16
See application file for complete search history.

(56) References Cited

U.S. PATENT DOCUMENTS

| 10,207,544 | B2 | 2/2019 | Celik et al. | B60C 7/14 |
| 10,286,725 | B2 | 5/2019 | Celik et al. | B60B 9/04 |
| 10,406,852 | B2 | 9/2019 | Celik et al. | B60B 9/00 |
| 10,457,094 | B2 | 10/2019 | Celik et al. | B60B 15/12 |
| 10,603,956 | B2 | 3/2020 | Celik et al. | B60C 7/26 |
| 11,110,749 | B2 | 9/2021 | Celik et al. | B60C 7/06 |
| 2012/0205017 | A1* | 8/2012 | Endicott | B60B 21/06 152/1 |
| 2019/0016176 | A1* | 1/2019 | Johnson | B60B 25/006 |
| 2019/0126673 | A1* | 5/2019 | Celik | B60C 7/107 |
| 2019/0152256 | A1* | 5/2019 | Hwang | B60B 25/20 |
| 2020/0047555 | A1* | 2/2020 | Costlow | B29D 30/02 |
| 2020/0171884 | A1* | 6/2020 | Lee | B60C 7/107 |
| 2021/0061010 | A1* | 3/2021 | Van Riper | B60C 7/14 |
| 2021/0188003 | A1* | 6/2021 | Kandel | B60C 7/18 |

FOREIGN PATENT DOCUMENTS

GB 191514115 A * 8/1916

* cited by examiner

*Primary Examiner* — Kip T Kotter
(74) *Attorney, Agent, or Firm* — June E. Rickey; Robert N. Lipcsik (57) ABSTRACT

A wheel assembly for a tire includes a circular hub member for securing to a rotatable axle of a vehicle, an annular first rim piece for engaging the tire, the first rim piece being secured to a first axial end of the circular hub member, an annular second rim piece for engaging the tire, the second rim piece being secured to an opposite second axial end of the circular hub member, a plurality of cylindrical bolts for engaging both the first rim piece and the second rim piece, the cylindrical bolts each engaging the first rim piece, the second rim piece, and a spoke structure of the tire; and a threaded tension bolt for varying a radial position of a first axial end of one of the cylindrical bolts relative to a first elongate opening of the first rim piece.

20 Claims, 6 Drawing Sheets

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, adjustment of the spoke tension provides a variable performance range for the tire assembly. It is an object of the present invention to allow adjustability of the spoke tension and hence performance tunability of the tire per the desired application, expanding the versatility of a single non-pneumatic tire construction.

Definitions

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Cut shearband ply" refers to a shearband having a width less than the tread width, which lies flat over the carcass plies in the crown area of the tire.

"Crown" means that portion of the tire in the proximity of the tire tread.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Footprint" means the contact patch or area of contact of the tire tread with a flat surface at zero speed and under normal load and pressure.

"Inner" means toward the inside of the tire and "outer" means toward its exterior.

"Inboard side" means the side of the tire nearest the vehicle when the tire is mounted on a wheel and the wheel is mounted on the vehicle.

"Lateral" means an axial direction.

"Load range" means load and inflation limits for a given tire used in a specific type of service as defined by tables in The Tire and Rim Association, Inc.

"Net contact area" means the total area of ground contacting elements between defined boundary edges as measured around the entire circumference of the tread.

"Normal load" means the specific design inflation pressure and load assigned by the appropriate standards organization for the service condition for the tire.

"Outboard side" means the side of the tire farthest away from the vehicle when the tire is mounted on a wheel and the wheel is mounted on the vehicle.

"Radial" and "radially" mean directions radially toward or away from the axis of rotation of the tire.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall" means that portion of a tire radially between the tread and the bead.

"Spring rate" means the stiffness of tire expressed as the slope of the load deflection curve at a given pressure.

"Stiffness ratio" means the value of a control shearband structure stiffness divided by the value of another shearband structure stiffness when the values are determined by a fixed three point bending test having both ends of the cord supported and flexed by a load centered between the fixed ends.

"Tensile stress" is force expressed in force/cross-sectional area. Strength in psi=12,800 times specific gravity times tenacity in grams per denier.

"Tension" for a cord means force on the cord expressed as mN/tex.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Vertical deflection" means the amount that a tire deflects under load.

SUMMARY OF THE INVENTION

A wheel assembly for a tire, in accordance with the present invention, includes a circular hub member for securing to a rotatable axle of a vehicle, an annular first rim piece for engaging the tire, the first rim piece being secured to a first axial end of the circular hub member, an annular second rim piece for engaging the tire, the second rim piece being secured to an opposite second axial end of the circular hub member, a plurality of cylindrical bolts for engaging both the first rim piece and the second rim piece, the cylindrical bolts each engaging the first rim piece, the second rim piece, and a spoke structure of the tire; and a threaded tension bolt for varying a radial position of a first axial end of one of the cylindrical bolts relative to a first elongate opening of the first rim piece.

According to another aspect of the wheel assembly, the first rim piece has an axially extending cylindrical first rim flange.

According to still another aspect of the wheel assembly, the second rim piece has an axially extending cylindrical second rim flange.

According to yet another aspect of the wheel assembly, each of the first elongate openings of the first rim piece are axially aligned with corresponding second elongate openings of the second rim piece.

According to still another aspect of the wheel assembly, each of the cylindrical bolts has a radially outer surface for engaging corresponding loops of the tire.

According to yet another aspect of the wheel assembly, each corresponding pair of first and second elongate openings are radially and circumferentially secured and fixed in axially aligned relative positions by one of the cylindrical bolts and a corresponding threaded tension bolt.

According to still another aspect of the wheel assembly, a radial adjustment assembly includes the threaded tension bolt, a load collar for applying a measured external load to the cylindrical bolts (for spoke tension adjustability), and a lock nut for fixedly securing the tension bolt to a first axial end of one of the cylindrical bolts. Alternatively, a radial adjustment assembly includes the threaded tension bolt, a torque sleeve for aligning the first and second rim pieces and the cylindrical bolts, and a lock nut for fixedly securing the tension bolt to a first axial end of one of the cylindrical bolts.

According to yet another aspect of the wheel assembly, the tension bolts are threadedly adjusted to vary a radial position of the first axial end of one of the cylindrical bolts relative to the first elongate opening of the first rim piece.

According to still another aspect of the wheel assembly, the first and second rim pieces are constructed of a metal.

According to yet another aspect of the wheel assembly, the first and second rim pieces are constructed of a polymer.

A method in accordance with the present invention supports a vehicle load. The method includes the steps of: axially engaging first ends of cylindrical bolts with a first rim piece; axially engaging second ends of the cylindrical bolts with a second rim piece; axially and radially engaging loop members of a tire assembly by outer cylindrical surfaces of the cylindrical bolts; inserting one axial end of each cylindrical bolt through a first elongate opening in the first rim piece; and inserting an opposite axial end of each cylindrical bolt through a corresponding second elongate opening in the second rim piece.

According to another aspect of the method, a further step includes axially securing a plurality of tension bolts to each opposite axial end of the cylindrical bolts.

According to still another aspect of the method, a further step includes securing a circular hub member to the first rim piece thereby allowing rotational attachment to a vehicle.

According to yet another aspect of the method, a further step includes arraying a plurality of first elongate openings circumferentially about the first rim piece.

According to still another aspect of the method, a further step includes arraying a plurality of second elongate openings circumferentially about the second rim piece.

According to yet another aspect of the method, a further step includes radially and circumferentially fixing the first rim piece to the second rim piece in axially aligned relative positions by the cylindrical bolts and a tension bolt.

According to still another aspect of the method, a further step includes engaging a cylindrical outer surface of each of the cylindrical bolts by a corresponding loop of a tire.

According to yet another aspect of the method, a further step includes permanently securing a tension bolt to each opposite end of the cylindrical bolts.

According to still another aspect of the method, a further step includes adjusting tension in loops of a tire by radially varying each axial end of each cylindrical bolt.

According to yet another aspect of the method, a further step includes maintaining flat contact between a loop of a tire and a semi-cylindrical retainer.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

An example wheel/tire assembly, such as that described in Applicant's U.S. Pat. Nos. 10,207,544 and 10,603,956, both incorporated herein by reference in their entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

Figure 6:
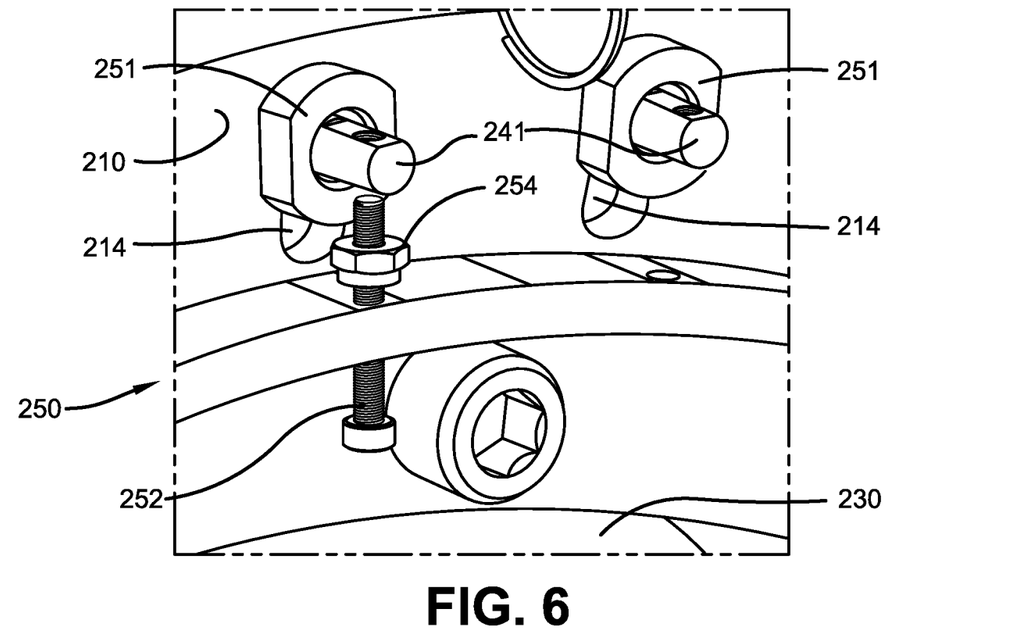
FIG. 6 is a detailed schematic perspective view of a fifth part of the example wheel assembly of FIG. 1.
Figure 7:
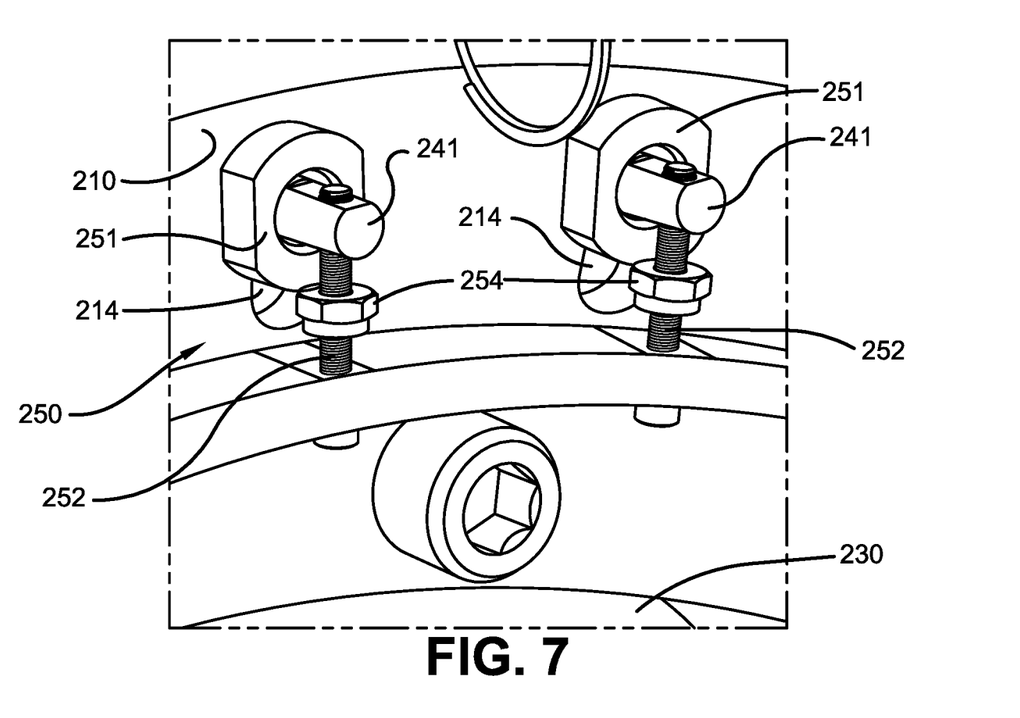
FIG. 7 is another detailed schematic perspective view of the fifth part of the wheel assembly of FIG. 6.
Figure 8:
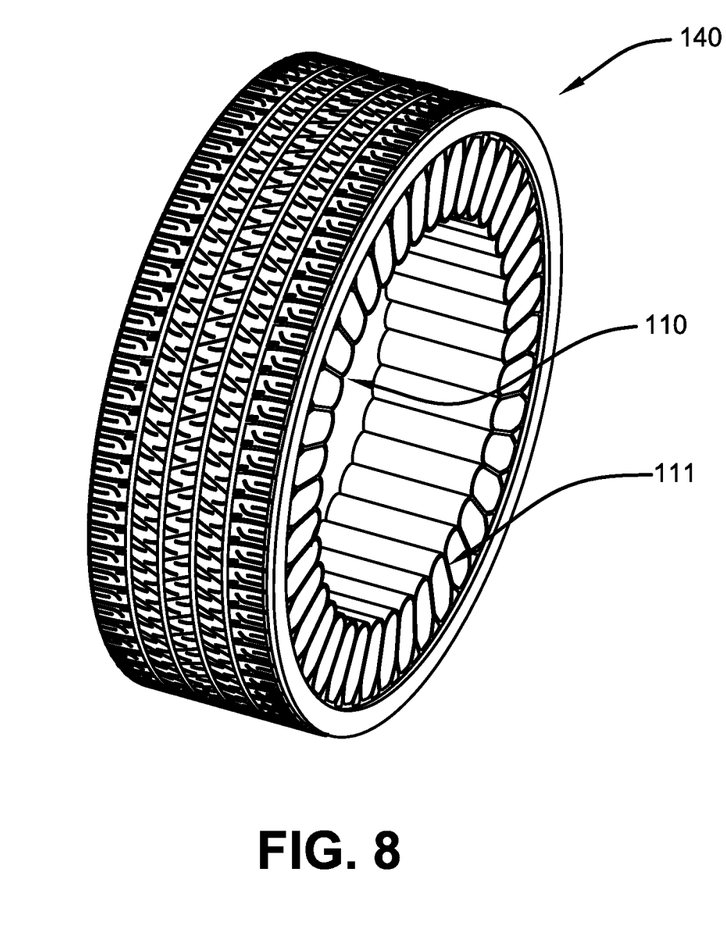
FIG. 8 is a schematic perspective view of an example tire for use with the example wheel assembly of FIG. 1.

FIGS. 1 through 9 show a wheel assembly 200 in accordance with the present invention for use with pneumatic and/or non-pneumatic tire assemblies, such as the example tire assembly in FIG. 8 and as described above. The wheel assembly 200 may include a first annular rim piece 210 and a second axially opposite second annular rim piece 220. Both rim pieces 210, 220 may be secured to a circular hub member 230 and thereby secured to a rotatable axle or similar structure of a vehicle (not shown). The first and second rim pieces 210, 220 may be constructed of any suitable material, such as metal, polymer, ceramic, and/or a combination thereof.

The first rim piece 210 may have an axially extending cylindrical first rim flange 212 and the second rim piece 220 may have an axially extending cylindrical second rim flange (not shown). The first rim piece 210 may further have a plurality of axially extending first elongate openings 214 each for engaging a first axial end 241 of a corresponding axially extending cylindrical bolt 240. The second rim piece 220 may further have a plurality of axially extending second elongate openings 224 each for engaging a second opposite axial end 242 of the corresponding cylindrical bolt 240. The cylindrical bolts 240 may each have radially outer surfaces 245 for engaging corresponding loops 111 of a spoke structure 110 of an example tire assembly 140.

Figure 1:
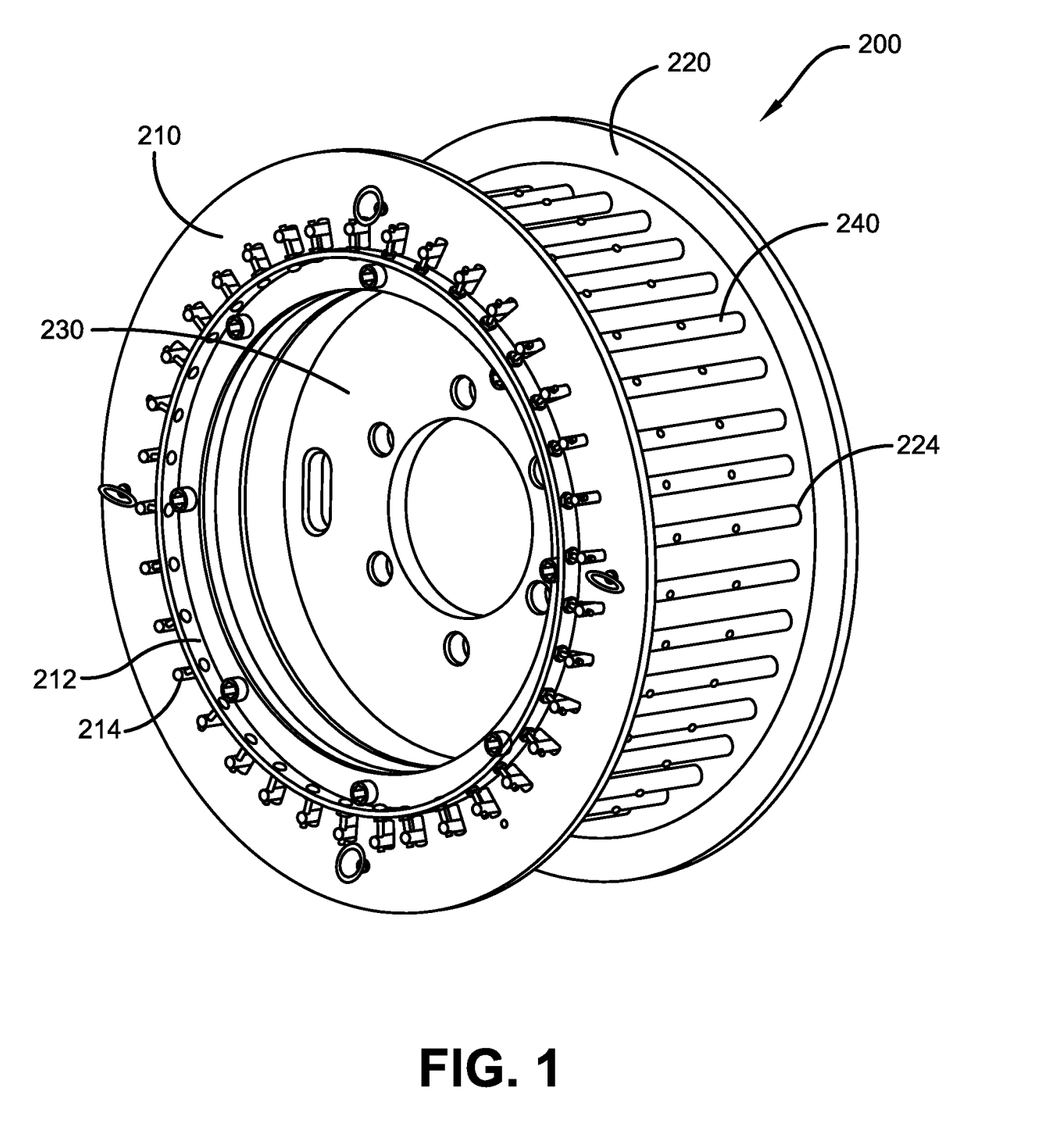
FIG. 1 is a schematic perspective view of an example wheel assembly in accordance with the present invention.
Figure 2:
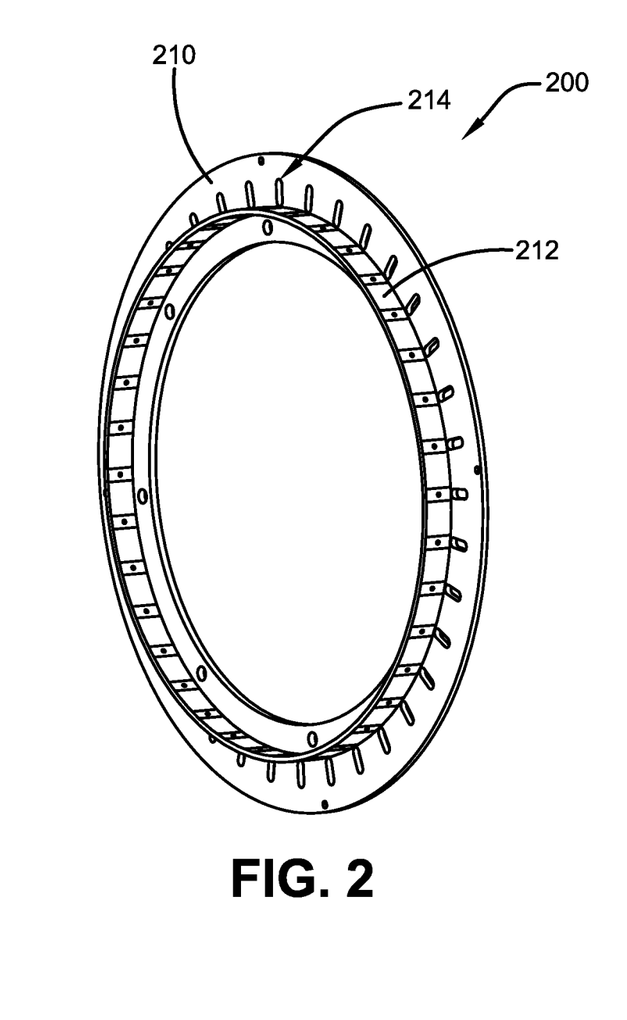
FIG. 2 is another schematic perspective view of a first part of the example wheel assembly of FIG. 1.
Figure 3:
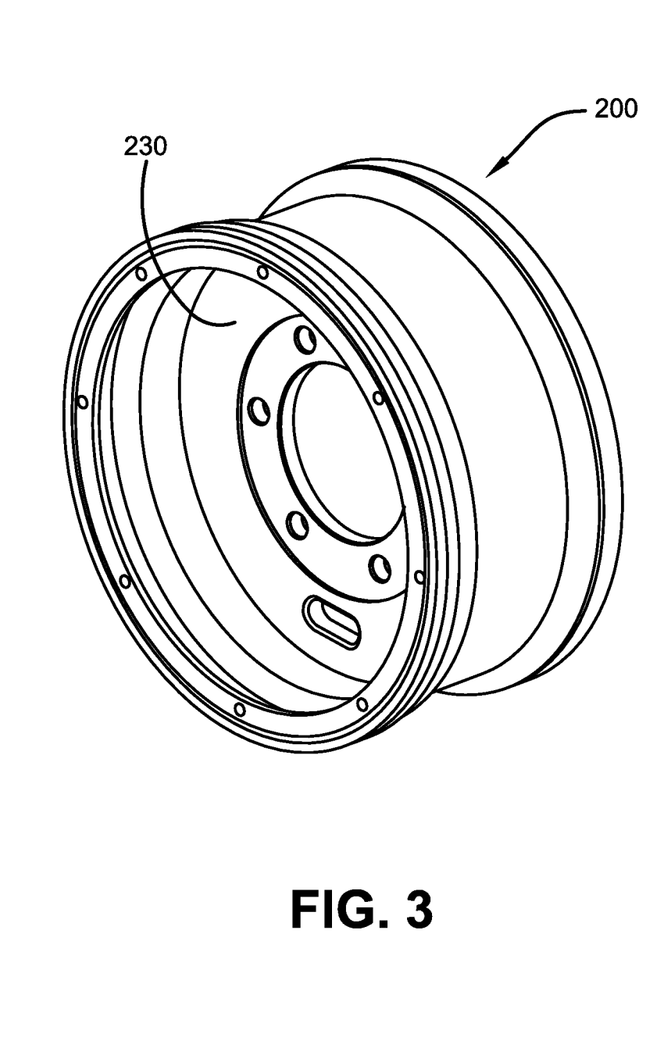
FIG. 3 is still another schematic perspective view of a second part of the example wheel assembly of FIG. 1.
Figure 4:
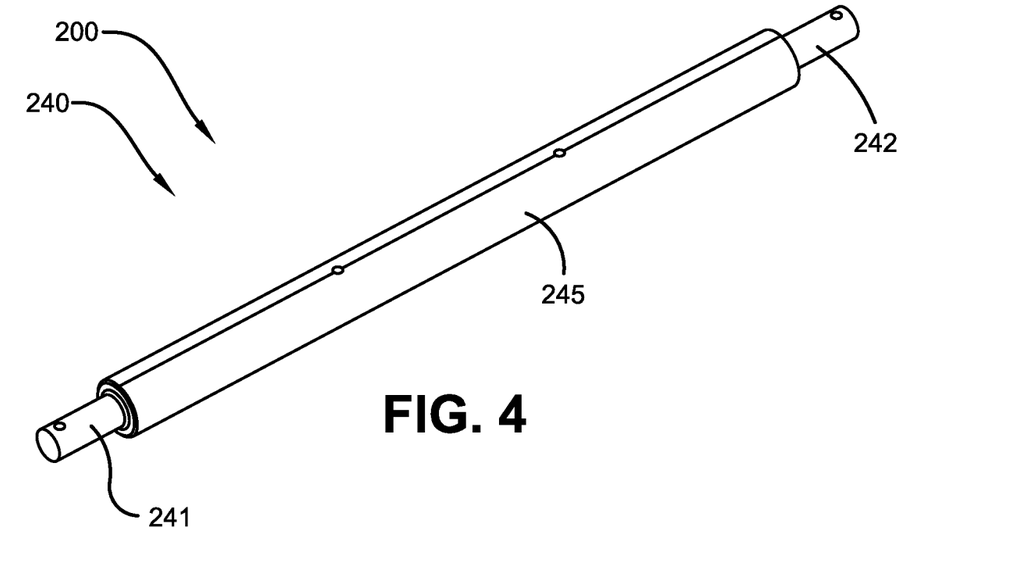
FIG. 4 is yet another schematic perspective view of a third part of the example wheel assembly of FIG. 1.

Once these elements 140, 210, 220, 230 have been assembled, each first elongate opening 214 of the first rim piece 210 may align axially with a corresponding second elongate opening 224 of the second rim piece 220 (FIG. 1). Each corresponding pair of elongate openings 214, 224 of each rim piece 210, 220 may be radially and circumferentially secured and fixed in these aligned relative positions by the cylindrical bolts 240 and corresponding fastener assemblies 250 at both ends 214, 224 of the cylindrical bolts.

As shown in FIGS. 6 and 7, each fastener assembly 250 may include a load collar, or torque sleeve, 251 for applying a measured external load to the cylindrical bolts 240, a radially extending threaded tension bolt 252 threadedly secured to the cylindrical rim flange 212 and an axial end 241 or 242 of a cylindrical bolt 240, and a lock nut 254 for fixedly securing the tension bolt 252 and the axial end 241 or 242 of the cylindrical bolt 240. The tension bolts 252 may be threadedly adjusted (loosened or tightened) to vary a radial position of the axial end 241 or 242 relative to the elongate opening 214 or 224 prior to the locknut 254 being threadedly secured permanently to the axial end 241 or 242 of the cylindrical bolt 240. Thus, tension in the loops 111 of the spoke structure 110 of the tire assembly 140 may be individually radially adjusted at each axial end 241 or 242 of each cylindrical bolt 240 by each fastener assembly 250.

Figure 5:
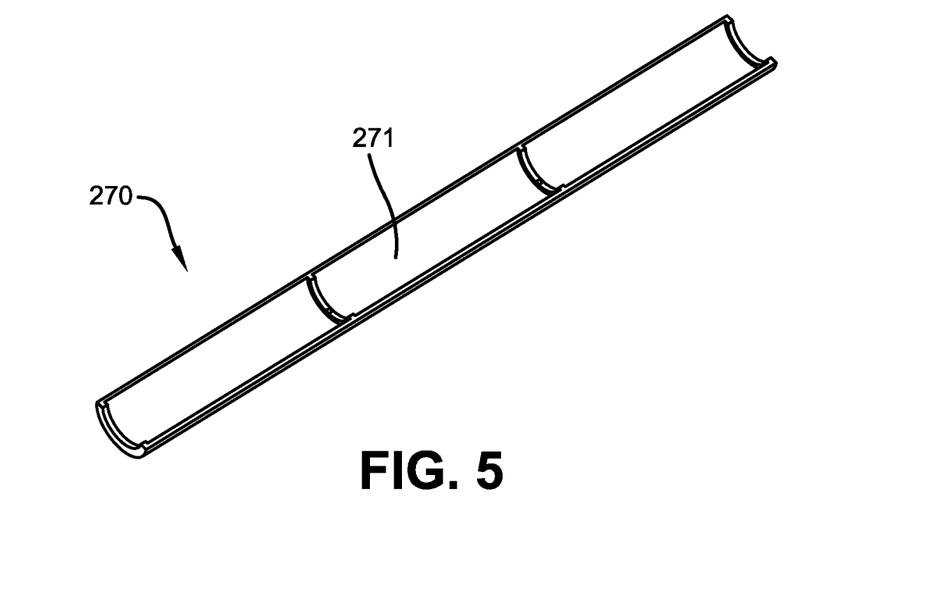
FIG. 5 is still another schematic perspective view of a fourth part of the example wheel assembly of FIG. 1.
Figure 9:
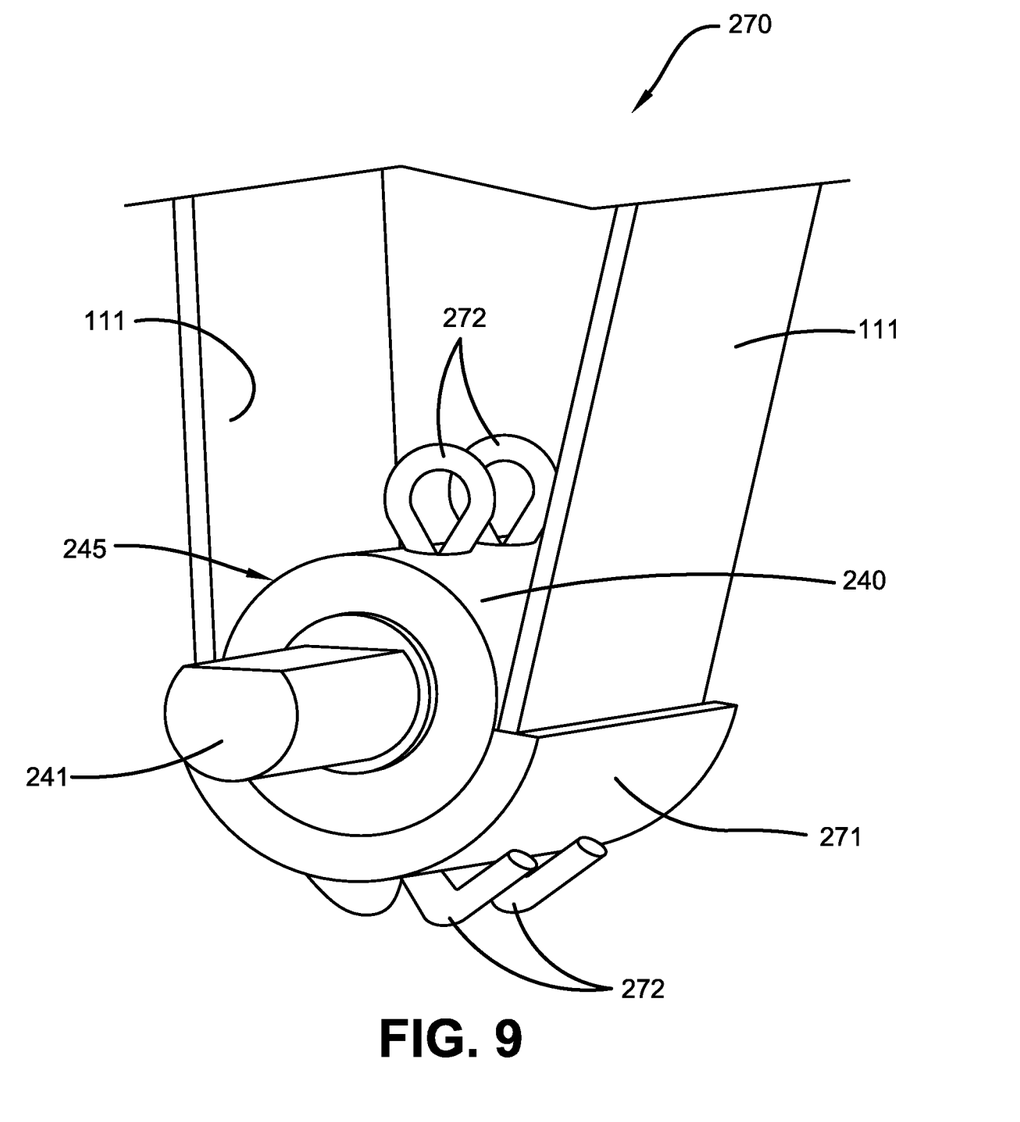
FIG. 9 is a detailed schematic perspective view of a junction between the wheel assembly of FIG. 1 and the example tire of FIG. 8.

As shown in FIGS. 5 and 9, a retainer assembly 270 may include: a semi-cylindrical retainer 271 for maintaining flat contact between each loop 111 of the tire 140 and each cylindrical bolt 240; and two or more cotter pins 272 for radially securing each loop 111 sandwiched between the retainer 271 and the radially outer surface 245 of each cylindrical bolt 240. The retainers 271 thereby maintain positive, flat contact between the loops 111 and cylindrical bolts 240 when the loops 111 are slackened by a footprint area of the tire 140 during rotation and under load. This constant flat and sandwiched contact between the loops 111 and the retainers 271 also mitigates rubbing/creasing/tearing of the loops 111 over many rotations of the tire 140 under load.

The above described radial adjustment of the cylindrical bolts 240 relative to the rim pieces 210, 220 may thus enable fine-tuning of the performance stiffness of the spoke structure 110 of the tire 140 on the fly (e.g., increase connecting structure tension for a pre-loaded condition, remove tension rods to reduce the number of engaged connecting structure loops, etc.). Such stiffness adjustment allows use of identical tires for multiple requirement and purposes.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A wheel assembly for a tire for mounting on a rotatable axle of a vehicle, the tire including a spoke structure having spoke loops, the wheel assembly comprising:
    a circular hub member for securing to the rotatable axle of the vehicle;
    an annular first rim piece for engaging the tire, the first rim piece being secured to a first axial end of the circular hub member;
    an annular second rim piece for engaging the tire, the second rim piece being secured to an opposite second axial end of the circular hub member;
    a plurality of cylindrical bolts for engaging both the first rim piece and the second rim piece, the cylindrical bolts each engaging the first rim piece, the second rim piece, and the spoke structure of the tire; and
    a threaded tension bolt for varying a radial position of a first axial end of one of the cylindrical bolts relative to a first elongate opening of the first rim piece.

2. The wheel assembly as set forth in claim 1 wherein the first rim piece has an axially extending cylindrical first rim flange.

3. The wheel assembly as set forth in claim 2 wherein the second rim piece has an axially extending cylindrical second rim flange.

4. The wheel assembly as set forth in claim 3 wherein the first elongate opening of the first rim piece is axially aligned with a corresponding second elongate openings of the second rim piece.

5. The wheel assembly as set forth in claim 1 wherein each of the cylindrical bolts has a radially outer surface for engaging the spoke loops of the tire.

6. The wheel assembly as set forth in claim 4 wherein the first and second elongate openings are radially and circumferentially secured and fixed in axially aligned relative positions by one of the cylindrical bolts and a corresponding threaded tension bolt.

7. The wheel assembly as set forth in claim 1 further including a a load collar for applying a measured external load to the cylindrical bolts, and a lock nut for fixedly securing the tension bolt to a first axial end of one of the cylindrical bolts.

8. The wheel assembly as set forth in claim 1 wherein the tension bolt is threadedly adjusted to vary a radial position of the first axial end of one of the cylindrical bolts relative to the first elongate opening of the first rim piece.

9. The wheel assembly as set forth in claim 1 wherein the first and second rim pieces are constructed of a metal.

10. The wheel assembly as set forth in claim 1 wherein the first and second rim pieces are constructed of a polymer.

11. A method for supporting a vehicle load, the method comprising the steps of:
    axially engaging first ends of cylindrical bolts with a first rim piece;
    axially engaging second ends of the cylindrical bolts with a second rim piece;
    axially and radially engaging loop members of a tire assembly by outer cylindrical surfaces of the cylindrical bolts;
    inserting one axial end of each cylindrical bolt through a first elongate opening in the first rim piece; and
    inserting an opposite axial end of each cylindrical bolt through a corresponding second elongate opening in the second rim piece.

12. The method as set forth in claim 11 further including a step of securing a plurality of tension bolts to a respective end of the cylindrical bolts.

13. The method as set forth in claim 11 further including a step of securing a circular hub member to the first rim piece thereby allowing rotational attachment to a vehicle.

14. The method as set forth in claim 11 further including a step of arraying a plurality of first elongate openings circumferentially about the first rim piece.

15. The method as set forth in claim 14 further including a step of arraying a plurality of second elongate openings circumferentially about the second rim piece.

16. The method as set forth in claim 11 further including a step of radially and circumferentially fixing the first rim piece to the second rim piece in axially aligned relative positions by the cylindrical bolts and a tension bolt.

17. The method as set forth in claim 11 further including a step of engaging a cylindrical outer surface of each of the cylindrical bolts by a corresponding loop of a tire.

18. The method as set forth in claim 11 further including a step of permanently securing a tension bolt to each opposite end of the cylindrical bolts.

19. The method as set forth in claim 11 further including a step of adjusting tension in loops of a tire by radially varying each axial end of each cylindrical bolt.

20. The method as set forth in claim 11 further including a step of maintaining flat contact between a loop of a tire and a semi-cylindrical retainer.

* * * * *